> United States Patent Office 3,426,969
Patented Feb. 11, 1969

3,426,969
CONDITION CONTROLLER WITH BISTABLE SWITCHING
Walter M. Anderson, Jr., Reading, Mass., assignor to Texas Instruments Incorporated, Dallas, Tex., a corporation of Delaware
Filed May 18, 1967, Ser. No. 639,382
U.S. Cl. 236—78                   20 Claims
Int. Cl. H03k 17/00, 19/00; H03f 9/00

ABSTRACT OF THE DISCLOSURE

A temperature controller is disclosed which employs time division or pulse width modulation to variably energize a heater in response to variations in the resistance of a thermistor. The relative lengths of the on and off periods are determined by integrating, to a preselected level, respective signals which vary oppositely to each other in response to variations in the resistance of the sensing thermistor.

Background of the invention

This invention relates to controllers and more particularly to a controller employing time division for variably energizing a load which, when energized, affects the parameter being controlled.

In time division proportional controllers known heretofore, the relative lengths of the on and off periods of the load may be affected differently by various outside variables such as changes in ambient temperature, changes in supply voltage and variations in the characteristics of electronic components employed in the controller. These differential changes may adversely affect the accuracy of the control in maintaining the controlled parameter at a desired level.

Summary of the invention

Among the several objects of the present invention may be noted the provision of a controller whose operation is relatively unaffected by changes in variables other than the parameter being controlled; the provision of such a controller which exercises a proportional control; the provision of such a controller in which the width of the proportional band of control may be selectively varied; the provision of such a controller which can operate a load on A.C. without generating substantial radio frequency interference (RFI); the provision of such a controller which is highly reliable and relatively simple and inexpensive. Other objects and features will be in part apparent and in part pointed out hereinafter.

Briefly, a controller according to this invention is operative to vary the average energization of a load which, when energized, affects the parameter being controlled thereby to maintain that parameter at a preselected value. Variations in the controlled parameter, e.g., temperature, are detected by a sensor, e.g., a thermistor, which responds to variations in the parameter. Energization of the load is controlled by a bistable switching means having a first state in which the load is caused to be energized and a second state in which the load is caused to be deenergized. Means are also provided for generating and applying to an integrating means a first signal when the bistable means is in its first state and for generating and applying to the integrating means a second signal when the bistable means is in its second state. The generating means includes means interconnected with the sensor for varying the amplitude of at least the first signal in response to variations in the parameter being controlled. The integrating means controls a means for reversing the state of the bistable means when the integrated value of the signals applied to the integrating means exceeds a preselected level. Accordingly, the proportion of time during which the load is energized is varied in response to changes in the value of the parameter as detected by the sensor thereby maintaining the parameter substantially at the preselected level.

Brief description of the drawings

Corresponding reference characters indicate corresponding parts throughout the several views of the drawings.

Description of the preferred embodiments

Figure 1:
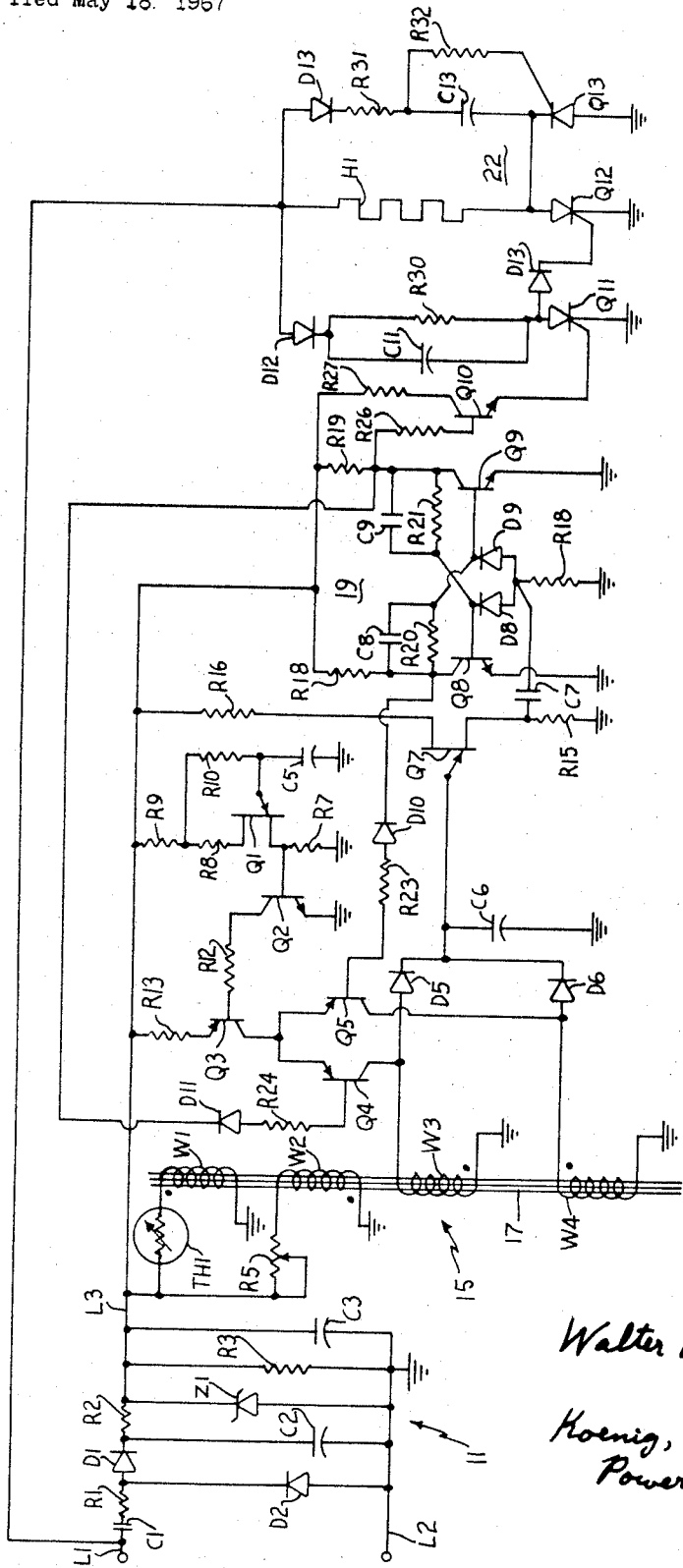
FIG. 1 is a schematic circuit diagram of a temperature controller according to this invention which variably energizes a heater with alternating current to maintain the temperature in a given zone at a preselected level.

Referring now to FIG. 1 there is indicated at H1 a heater which, when energized, raises the temperature in the zone being controlled. Heater H1 is selectively energized with A.C. obtained through a pair of leads L1 and L2 from suitable supply mains or other source (not shown). Lead L2 is connected to or constitutes local ground potential. The temperature within the zone is sensed by means of a thermistor TH1 which, as understood by those skilled in the art, is a sensor whose resistance changes as a function of its temperature.

A D.C. power supply 11 is energized from leads L1 and L2 and provides direct current, at a reduced voltage suitable for transistor circuitry, to a supply lead L3. A.C., coupled through a voltage dropping capacitor C1 and a current limiting resistor R1, is rectified by a pair of diodes D1 and D2 to charge a filter capacitor C2. Current obtained from capacitor C2 through a dropping resistor R2 is regulated by a Zener diode Z1 and filtered by a capacitor C3 to provide a regulated D.C. voltage source at lead L3. Capacitor C3 is shunted by a bleed resistor R3.

Thermistor TH1 is interconnected with a saturable reactor indicated generally at 15. Reactor 15 includes a saturable magnetic core 17. Wound on core 17 are four windings W1–W4 for applying magnetizing forces to the core. The instantaneous polarities of the windings W1–W4 are indicated by conventional dot designations. Thermistor TH1 is connected in series with winding W1 between leads L3 and ground for applying to core 17 a magnetizing force in one direction which varies as a function of the temperature in the controlled zone. Winding W2 is connected in series with a reference resistance, constituted by a rheostat R5, for applying to core 17 a magnetizing force of preselected magnitude in the opposite direction. In one sense, the windings W1 and W2 together with the thermistor TH1 and the reference rheostat R5 constitute a sort of bridge circuit. Assuming that the windings W1 and W2 are substantially identical, no net magnetizing force is applied to the core 17 when the bridge is balanced, i.e., when the thermistor and the reference rheostat have the same resistance.

A unijunction transistor Q1 is connected in a relaxation oscillator circuit for generating a series of pulses at a substantially constant frequency. The base-one terminal of unijunction transistor Q1 is connected to ground through a resistor R7 and its base-two terminal is connected to lead L3 through a pair of serially connected resistors R8 and R9. The emitter terminal of this unijunction transistor is forward biased by a resistor R10 which connects the emitter to the junction between the resistors R8 and R9. The emitter is also connected to ground through a timing capacitor C5 so that the unijunction transistor functions as a relaxation oscillator which generates pulses at a frequency determined by the relative values of resistor R10 and capacitor C5. This oscillator functions essentially as a clock and other types of pulse generators might be substituted.

The pulses generated at the base-one terminal of unijunction transistor Q1 are applied to the base terminal of an NPN transistor Q2 for amplification therein. The emitter of transistor Q2 is grounded. The amplified pulses provided at the collector of transistor Q2 are coupled to the base terminal of a PNP transistor Q3 through a resistor R12. The emitter of transistor Q3 is connected to lead L3 through a resistor R13.

The emitters of a pair of PNP transistors Q4 and Q5 are connected to the collector of transistor Q3. The collector of transistor Q4 is connected to one end of winding W3 and the collector of transistor Q5 is connected to one end of the winding W4. The other ends of windings W3 and W4 are grounded. As is explained in greater detail hereinafter, transistors Q4 and Q5 are forward biased into conduction alternately. Thus, at any given moment, one of these transistors is turned on and the other is cut off. Accordingly, the amplified pulses provided at the collector of transistor Q3 are transmitted, through whichever one of the transistors Q4 or Q5 is conducting, to the respective winding W3 or W4. It should be noted from the dot notation that the windings W3 and W4 are oppositely polarized with respect to their connections to the respective transistors. Thus, pulses passed by the transistor Q4 tend to magnetize core 17 in one direction while pulses passed by the transistor Q5 tend to magnetize the core in the opposite direction.

As is understood by those skilled in the art, the inductive reactance of the windings W3 and W4 and the pulses which can be developed across these windings depends upon the state of magnetization of the core 17 prior to the application of each pulse. If no initial magnetization is applied to the core, the pulses developed across winding W3 will be equal to those developed across winding W4. However, if core 17 is subjected to some net premagnetization by windings W1 and W2, the pulses which may be developed across windings W3 and W4 will be different. In one sense, the generating of pulses across the windings W3 and W4 may be considered an "interrogating" of the core 17 to determine its state of premagnetization.

The pulse signals developed across windings W3 and W4 are applied, through respective rectifying diodes D5 and D6, to one side of a capacitor C6. The other side of capacitor C6 is grounded. Capacitor C6 functions as an accumulator or integrator of the pulse signals to it. The rate at which this capacitor is charged thus depends upon the pulse signals applied thereto. Capacitor C6 is also connected to the emitter of a unijunction transistor Q7. The base-one terminal of unijunction transistor Q7 is connected to ground through a resistor R15 and its base-two terminal is connected to lead L3 through a resistor R16. When capacitor C6 is charged to a predetermined level by the pulse signals applied to it, unijunction transistor Q7 fires, discharging the capacitor and generating a sharp pulse at its base-one terminal.

The base-one terminal of unijunction transistor Q7 is coupled, through a capacitor C7 and respective gating diodes D8 and D9, to the base terminals of a pair of NPN transistors Q8 and Q9 which are interconnected in a triggerable bistable multivibrator or flipflop circuit designated generally at 19. The junction between the diodes D8 and D9 is biased to ground through a resistor R18. The emitters of transistors Q8 and Q9 are connected to ground and their collectors are connected, through respective load resistors R18 and R19, to the D.C. supply lead L3. The collector of transistor Q8 is connected, through a network comprising a capacitor C8 and a resistor R20, to the base terminal of transistor Q9 and the collector of transistor Q9 is connected, through a capacitor C9 and a resistor R21, to the base terminal of transistor Q8 thereby to provide the cross coupling which provides bistable operation.

As is understood by those skilled in the art, the bistable multivibrator circuit 19 has a first stable state in which transistor Q8 is cut off and transistor Q9 is conducting and a second stable state in which transistor Q9 is cut off and transistor Q8 conducts. The circuit can be switched from either one of these states to the other when by a pulse either one of these states to the other when triggered by a pulse applied to the base circuits through capacitor C7 and remains in the new state until again triggered. The unijunction transistor Q7 thus constitutes a means for triggering the bistable circuit.

The collector of transistor Q9 is connected, through a resistor R26, to the base of an NPN transistor Q10 which is operated as an emitter follower. The collector of transistor Q10 is connected to the D.C. supply lead L3 through resistor R27 and its emitter is connected to the gate electrode of an SCR (silicon controlled rectifier) Q11.

SCR Q11 controls conduction in an SCR power switching network 22 which comprises a pair of SCR's Q12 and Q13 connected "back-to-back" for applying full-wave power to the heater H1 from the A.C. supply lead L1. Heater H1 thus constitutes the load of SCR's Q12 and Q13. The anode of SCR Q11 is connected to lead L1 through a resistor R30 and a diode D12. Resistor R30 is shunted by a capacitor C11. The anode of SCR Q11 is also connected, through a diode D13, to the gate of SCR Q12. The cathode of SCR Q12 and the anode of SCR Q13 are grounded.

One side of the heater H1 is connected to A.C. supply lead L1 and the other end is connected to the anode of SCR Q12 and the cathode of SCR Q13. The cathode of SCR Q13 is also connected to the lead L1 through a capacitor C13, a resistor R31 and a diode D13. The gate of SCR Q13 is connected, through a resistor R32, to the junction between capacitor C13 and resistor R31.

When the bistable multivibrator circuit 19 is in its aforesaid first state so that the transistor Q9 is conducting, the emitter-follower transistor Q10 is turned off and the SCR power switching network 22 operates to apply fullwave A.C. to the heater H1 substantially as follows. When the emitter-follower transistor Q10 is not conducting, SCR Q11 is not triggered into conduction on those A.C. half cycles when lead L1 is positive with respect to ground. If SCR Q11 is not conducting at the beginning of any such positive A.C. half cycle, triggering current is applied, through diode D13, to the gate of SCR Q12. This SCR then conducts and passes current from lead L1 through the heater H1. In addition to applying current to the load, conduction in SCR Q12 charges capacitor C13. When capacitor C13 is charged during the positive half cycles, it provides a reservoir of charge for triggering SCR Q13 on the alternate half cycles. Accordingly, on the negative half cycles SCR Q13 conducts current from lead L1 through the heater H1. From the preceding it can be seen that if the SCR Q11 is not triggered substantially at the beginning of any positive half cycle of lead L1, current will then be applied to the heater H1 from the lead L1 for the entire A.C. cycle. In other words, all switching occurs essentially at the zero crossing point of the A.C. supply voltage and thus only very low level transients are developed and little radio frequency interference is generated.

In the opposite or second state of bistable multivibrator circuit 19, the transistor Q9 is cut off thereby turning on the emitter-follower transistor Q10. The emitter-follower transistor Q10 applies triggering current to the gate of SCR Q11 so that, on those A.C. half cycles when lead L1 is positive with respect to ground, SCR Q11 conducts. When SCR Q11 is conducting, no triggering current is applied to SCR Q12. If SCR Q12 does not conduct, the voltage at the anode of SCR Q12 and at the cathode of SCR Q13 follows the voltage at lead L1 and capacitor C13 is not charged. As described previously, the triggering of SCR Q13 depends upon the charging of capacitor C13 and thus when SCR Q12 does not conduct on the positive half cycle, SCR Q13 is not triggered on the negative half cycle. Accordingly, if the bistable multivibrator circuit 19 is in its second state at the beginning of a positive A.C. half cycle, the heater H1 is deenergized for an entire A.C. cycle.

The collector of transistor Q8 is connected, through a resistor R23 and a diode D10, to the base of transistor Q5 and the collector of transistor Q9 is connected, through a resistor R24 and a diode D11, to the base of transistor Q4. Accordingly, when the bistable circuit is in its first state and transistor Q9 is conducting, the transistor Q4 is turned on and when the bistable circuit is in its second state and the transistor Q8 is conducting, the transistor Q5 conducts. Thus, as noted previously, transistors Q4 and Q5 conduct alternately, the relative length of the periods of conduction being determined by the durations of the states of the bistable multivibrator circuit 19.

The relative durations of the first and second states of the bistable multivibrator circuit 19 are varied in response to the resistance of the thermistor TH1 substantially as follows. The system is arranged to provide a nominal energization of the heater equal to a fifty percent duty cycle when the temperature in the zone being controlled is at the desired level, that is, when the resistance of the thermistor TH1 is substantially equal to the resistance of the reference rheostat R5. In this state there is substantially no net premagnetization of the core 17 of reactor by windings W1 and W2. Accordingly, the pulses developed across windings W3 and W4 during the respective periods of conduction of transistors Q4 and Q5 are substantially the same.

When the bistable multivibrator circuit 19 is in its first state and the heater H1 is energized, the transistor Q4 conducts and the pulses generated by the unijunction transistor oscillator are applied across winding W3. These pulses charge capacitor C6 until the unijunction transistor Q7 fires. The firing of transistor Q7 applies a pulse to the base circuits of transistors Q4 and Q5 thereby reversing the state of the bistable multivibrator circuit 19 and deenergizing the heater H1. When the load is thus deenergized, transistor Q4 is turned off and transistor Q5 is turned on so that pulses are then generated across winding W4. These pulses then charge capacitor C6 until the state of the bistable multivibrator circuit 19 is again reversed by the unijunction transistor, reenergizing the heater H1. Since the pulses generated across windings W3 and W4 are the same, the time required to charge capacitor C6 to the triggering point of unijunction transistor 7 will be the same for both states of the bistable multivibrator circuit 19 and thus the fifty percent duty cycle of heater energization mentioned previously is obtained.

If, however, the temperature in the controlled zone falls below the desired level and the resistance of the thermistor TH1 varies accordingly, a net premagnetization is applied to the core 17 by the windings W1 and W2 and the pulses developed across windings W3 and W4 will no longer be the same. The resulting direction of net magnetization of core 17 is chosen in relation to the thermistor coefficient of resistivity (NTC or PTC) so that, when the zone temperature falls below the desired level, the pulses generated across winding W3 decrease in energy with respect to the pulses generated across winding W4. Capacitor C6 will thus charge more slowly when the bistable multivibrator circuit 19 is in its first state than when it is in its second state. Accordingly, the period of energization of the heater H1 becomes longer than the period of deenergization and the average energization or duty cycle of the heater is increased thereby raising the temperature in the zone being controlled. As will be apparent to those skilled in the art, this error-correcting application of heat constitutes a proportional inverse feedback which tends to maintain the temperature in the controlled zone at the preselected level represented by the setting of rheostat R5. This proportional control is also exercised when the temperature in the controlled zone rises above the set point. In that case the net premagnetization applied to the core 17 causes the pulses generated across winding W3 to be of greater energy than those generated across winding W4, the capacitor C6 charges more rapidly when the multivibrator circuit is in its first state and the duty cycle of and average power applied to the heater are reduced so that the temperature within the controlled zone drops back to the desired level.

Since the same integrating capacitor C6 functions to time both the on and off periods, it can be seen that any changes in the value of this capacitor or in the firing threshold of the unijunction transistor Q7, i.e., which might be caused by ambient temperature variations, will affect both the on and the off periods equally. Such variations will thus not affect the proportion of time during which the heater H1 is energized nor the average power applied thereto. Similarly, since the system is balanced when the resistance of the thermistor TH1 is equal to that of the temperature set rheostat R5, it can be seen that variations in the D.C. supply voltage will not affect the set point and a very precise temperature control may be obtained.

Figure 2:
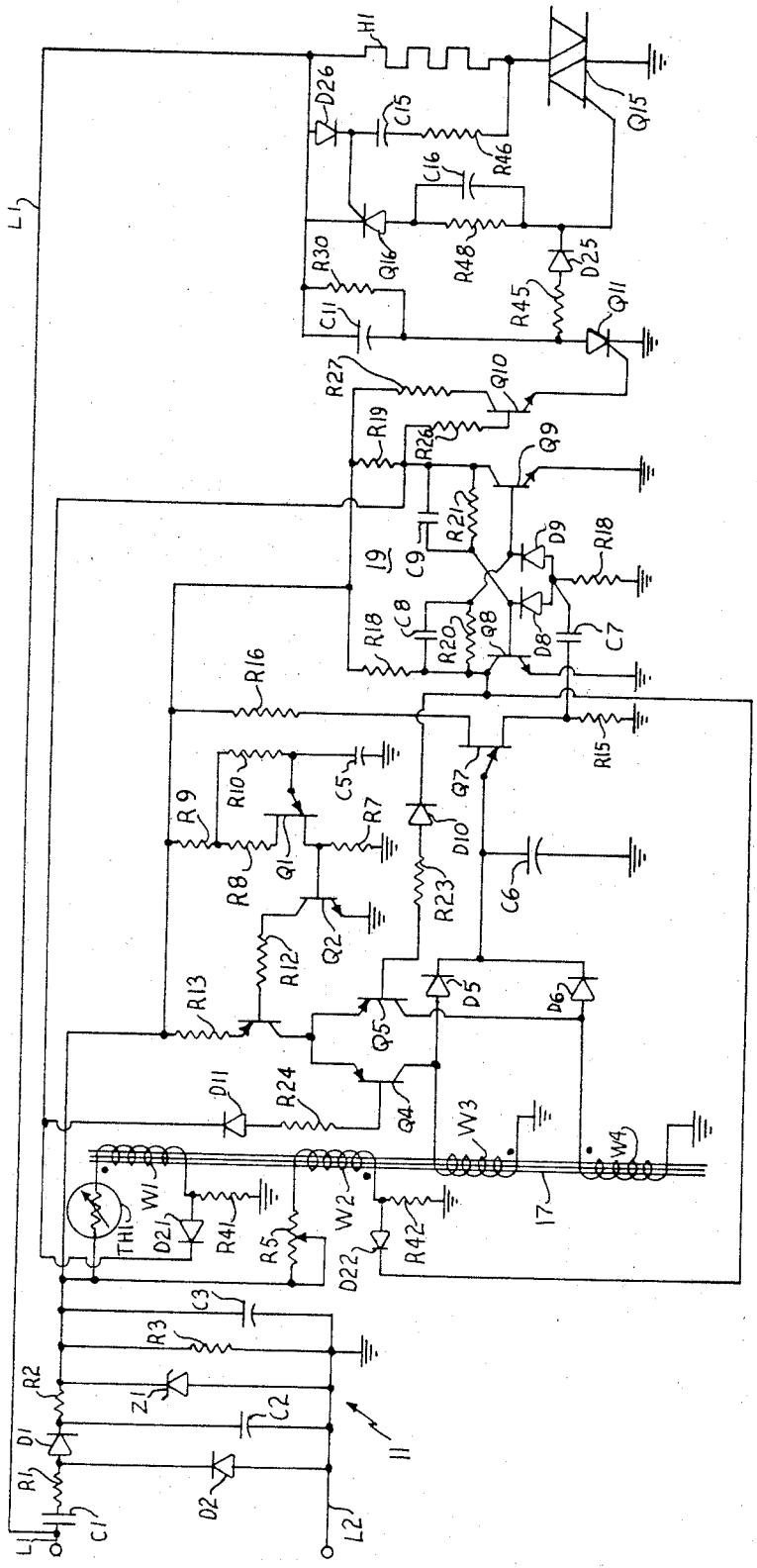
FIG. 2 is a schematic circuit diagram of a modification of the controller of FIG. 1 in which feedback is employed to selectively vary the width of the band of proportional temperature control.

The loop gain and the width of the band of proportional control of this basic system may be varied by applying feedback, for example, as illustrated in FIG. 2. In this embodiment the lower end of each of the windings W1 and W2 is connected to ground through a respective resistor R41 or R42 and the junction between each winding and its associated resistor is connected, through a respective diode D21 or D22 to the collector of a respective one of the bistable multivibrator transistors Q8 or Q9. Accordingly, the magnetization applied by the windings W1 and W2 to the core 17 depends not only upon the relative resistance values of the thermistor TH1 and the reference rheostat R5 but also upon the relative durations of the aforesaid first and second states of the multivibrator circuit.

As is understood by those skilled in the art, this application of a signal from the output to the input of the controller can constitute either positive or negative feedback depending upon whether a variation in the duty cycle augments or opposes the change in thermistor resistance which caused that variation in duty cycle. The sense of the feedback can be reversed by reversing the connections between the resistors R41 and R42 and the collectors of the multivibrator transistors Q8 and Q9. Feedback decreases or increases the loop gain of the controller depending upon whether the feedback is negative or positive and correspondingly affects the band of temperatures over which the controller exercises proportional control. Either positive or negative feedback may be applied depending upon whether it is desired to narrow or broaden the proportioning band. If sufficient positive feedback is applied, an overall hysteresis action may be provided in which there is a so-called "deadband" between the on and off temperatures.

FIG. 2 also illustrates an alternate system for applying full-wave power to the heater load H1. In this arrangement, SCR Q11 controls the application of triggering current, through a resistor R45 and a diode D25, to the gate of a triac Q15. If SCR Q11 is not conducting at the start of positive A.C. half cycle, triggering current is applied from the anode of SCR Q11 to the gate of the triac. Triac Q15 then conducts current through the load and simultaneously applies a triggering pulse, through a capacitor C15 and a resistor R46, to the gate of an SCR Q16. Conduction in SCR Q16 charges a capacitor C16 shunted by a bleed resistor R48. On the subsequent negative half cycle, the charge on capacitor C16 triggers triac Q15 so that it conducts current on this half cycle also. Power is thus applied to the heater load H1 for a full A.C. cycle whenever the SCR Q11 is no conducting at the beginning of the positive portion of the cycle. If SCR Q11 is conducting at the start of a positive half cycle, it will remain in conduction for the remainder of that half cycle and triac Q15 will not be triggered during the positive half cycle. Since capacitor C16 is not charged, the triac similarly will not be triggered during the negative half cycle.

Figure 3:
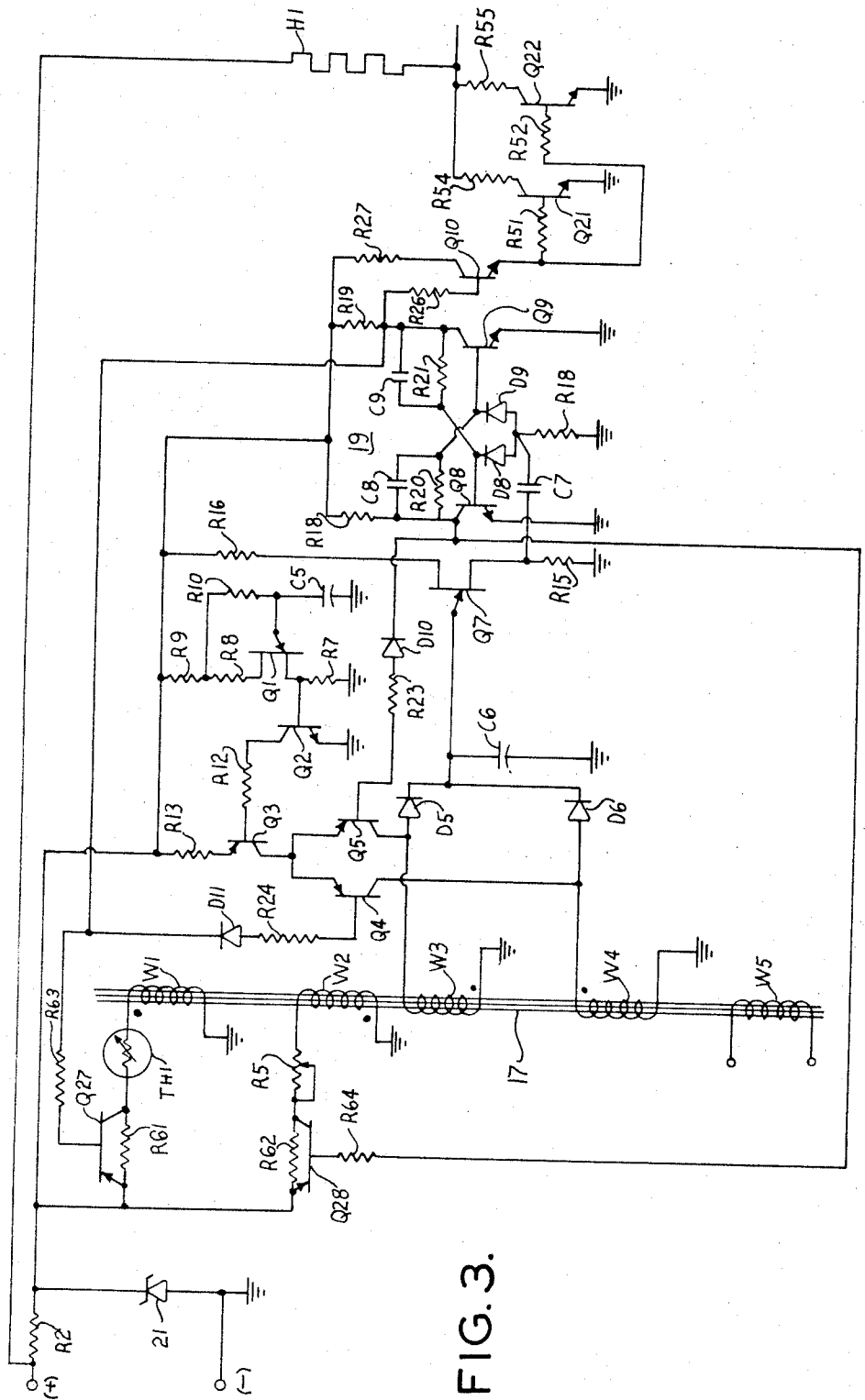
FIG. 3 is a schematic circuit diagram of a modification which variably energizes a load from a direct source.

In the embodiment illustrated in FIG. 3 the rectifying portion of the D.C. power supply is omitted and the entire controller including the heater H1 is energized directly from a D.C. source. In this embodiment, the emitter of the emitter-follower transistor Q10 is connected, through respective resistors R51 and R52, to the base terminals of a pair of power switching transistors Q21 and Q22. The emitters of transistors Q21 and Q22 are connected to ground and their collectors are connected, through respective resistors R54 and R55, to one side of the heater H1. The other side of the heater is connected to the D.C. supply lead. The resistors R54 and R55 assure that the load current is shared substantially equally by the power switching transistors in spite of any differences in their saturation voltages. These transistors are thus effectively connected in parallel and as many such transistors may be employed as are needed to carry the load current.

The transistors Q21 and Q22 are turned on when the bistable multivibrator transistor Q9 is turned off. Thus, in the embodiment of FIG. 3, this state, rather than the state when transistor Q9 is conducting, may conveniently be considered to be the "first" state of the bistable circuit, i.e., the state in which the heater load is caused to be energized. As in the previous embodiments, the average energization or duty cycle of the heater H1 depends on the relative durations of the complementary states of the bistable circuit even though the operation of the particular bistable circuit illustrated has been inverted.

To cause each of the windings W3 and W4 to time the proper portion of the cycle, i.e., the on or the off portion, despite the inversion of the operation of the bistable circuit 19, the connections between the transistors Q4 and Q5 and the winding W3 and W4 are reversed. Accordingly, the winding W3 is still the winding which charges capacitor C6 during the on portion of the cycle. Thus the energization of the heater is still varied as an inverse function of the temperature in the controlled zone to maintain that temperature at the preselected level.

The embodiment of FIG. 3 also incorporates a different feedback system. The thermistor TH1 and the reference resistance are connected to the D.C. supply lead L3 through respective resistors R61 and R62 which are shunted by the collector-emitter circuits of respective switching transistors Q27 and Q28. The base terminals of transistors Q27 and Q28 are connected, through respective resistors R63 and R64, to the collector terminals of respective ones of the bistable multivibrator transistors Q8 and Q9. Accordingly, as in the example of FIG. 2, the net premagnetization applied to the core 17 depends not only upon the relative resistance values of the thermistor TH1 and the reference rheostat R5 but also upon the relative durations of the bistable circuit states. Thus feedback is provided which may be varied in amplitude and polarity to adjust the band of proportional control as desired.

The embodiment illustrated in FIG. 3 also includes a fifth winding W5 on the core 17 by means of which the premagnetization of the core may be adjusted independently of the windings W1 and W2. The application of a current to this winding thus has the effect of shifting the set point of the controller and adjusting the temperature at which the controlled zone is maintained. By means of windings such as W5, a plurality of controllers such as that illustrated in FIG. 3 may be simultaneously adjusted by means of a signal applied commonly to the windings W5 of all of the controllers. Thus, the temperatures in a plurality of separately controlled zones may be collectively varied.

While the controller of the present invention has been illustrated in a temperature control environment cooperating with a heater constituting a load which, when energized, varies the temperature in a controlled zone and a thermistor for sensing that temperature, it can be seen that this controller may also be used for maintaining other variables or parameters at a desired level.

In view of the above it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:
1. A controller for varying the average energization of a load which, when energized, affects a parameter being controlled thereby to maintain said parameter at a preselected value, said controller comprising:
   a sensor which responds to variations in said parameter;
   triggerable bistable switching means for controlling the energization of said load, said bistable means having a first stable state in which said load is caused to be energized and a second stable state in which said load is caused to be deenergized, said bistable means being operative to reverse its state when triggered and to remain in the new state until it is again triggered;
   integrating means;
   means responsive to said bistable means for generating and applying to said integrating means a first signal when said bistable means is in its first state and for generating and applying to said integrating means a second signal when said bistable means is in its second state, said generating means including means interconnected with said sensor for varying at least said first signal in response to variations in said parameter; and
   means interconnected with and controlled by said integrating means for triggering said bistable means to reverse its state when the integrated value of the signals applied to said integrating means exceeds a preselected level whereby the proportion of time during which said load is energized is varied in response to changes in the value of said parameter as detected by said sensor thereby to maintain said parameter substantially at said preselected level.

2. A controller as set forth in claim 1 wherein said sensor comprises a thermistor and said load comprises a heater.

3. A controller as set forth in claim 1 wherein said bistable switching means comprises a transistor multivibrator.

4. A controller as set forth in claim 1 wherein said means for generating said first and second signals includes a saturable reactor having at least one winding interconnected with said sensor and at least a pair of windings across which said first and second signals are generated respectively.

5. A controller as set forth in claim 4 wherein said means for generating said first and second signals further comprises an oscillator for applying pulses to said pair of windings.

6. A controller as set forth in claim 5 wherein said oscillator comprises a unijunction transistor relaxation oscillator.

7. A controller as set forth in claim 5 wherein said means for generating said first and second signal includes gate means for passing pulses generated by said oscillator to said pair of windings alternately in response to the state of said bistable means.

8. A controller as set forth in claim 1 wherein said integrating means comprises a charge storing capacitor.

9. A controller as set forth in claim 8 wherein said bistable means includes a transistor multivibrator and wherein said means for reversing the state of said bistable means includes a unijunction transistor interconnected with said capacitor and said transistor multivibrator for applying a pulse to said multivibrator to reverse its state when the charge on said capacitor exceeds a predetermined level.

10. A controller as set forth in claim 1 wherein said bistable switching means includes a zero-crossing A.C. power switching circuit.

11. A controller as set forth in claim 10 wherein said power switching circuit comprises first and second power switching SCR's, a triggering SCR, means responsive to non-conduction in said triggering SCR during A.C. half cycles of one polarity for triggering said first power switching SCR, and means, including a charge-storing capacitor, responsive to conduction in said first power switching SCR for triggering said second power switching SCR on A.C. half cycles of opposite polarity.

12. A controller as set forth in claim 10 wherein said power switching circuit comprises a triac.

13. A controller as set forth in claim 1 wherein said means for generating said first and second signals includes a saturable reactor having a saturable magnetic core, a first winding on said core connected with said sensor for applying to said core a magnetizing force in one direction which varies in response to the resistance of said sensor, and a second winding on said core interconnected with a reference resistance for applying a preselected magnetizing force to said core in the opposite direction.

14. A controller as set forth in claim 13 including means interconnecting said bistable means and said first and second windings for applying feedback around said controller.

15. A controller as set forth in claim 14 wherein said means for applying feedback includes respective transistors in series with said thermistor and said reference resistance and also means responsive to the state of said bistable means for turning said transistors on alternately.

16. A temperature controller for maintaining the temperature in a zone at a preselected level, said controller comprising:
  a heater which, when energized, raises the temperature in said zone;
  bistable switching means for controlling the energization of said heater, said bistable means having a first stable state in which said heater is caused to be energized and a second stable in which said heater is caused to be deenergized;
  a thermistor for sensing the temperature in said zone;
  a reference resistance;
  reactor means including a saturable core, a first winding on said core interconnected with said thermistor for magnetizing said core in one direction to an extent which varies as a function of the temperature in said zone, a second winding on said core for magnetizing said core in the opposite direction to an extent which depends upon the value of said reference resistance, and third and fourth windings on said core;
  means for periodically applying current pulses to said third winding to magnetize said core in said one direction when said bistable means is in one of its states thereby to obtain a first signal, which first signal varies as a function of the relative resistance values of said thermistor and said reference resistance, and for periodically applying current pulses to said fourth winding to magnetize said core in said opposite direction when said bistable means is in the other of its states thereby to obtain a second signal, which second signal varies as an inverse function of the relative resistance values of said thermistor and said reference resistance;
  a capacitor;
  rectifier means for applying said first and second signals to said capacitor to charge it; and
  means interconnected with said capacitor for reversing the state of said bistable means when the charge on said capacitor reaches a preselected level and for simultaneously discharging said capacitor whereby the proportion of time during which said heater is energized is varied in response to the resistance of said thermistor thereby to maintain the temperature in said zone at said preselected level.

17. A temperature controller as set forth in claim 16 wherein said bistable switching means comprises a transistor multivibrator having first and second stable states.

18. A temperature controller as set forth in claim 17 wherein said means for reversing the state of said bistable means comprises a unijunction transistor for applying a pulse to said transistor multivibrator to reverse its state when the charge on said capacitor reaches a preselected level.

19. A temperature controller as set forth in claim 18 wherein said means for applying current pulses to said third and fourth windings includes a unijunction transistor relaxation oscillator.

20. A temperature controller as set forth in claim 19 wherein said means for applying pulses to said third and fourth windings further includes respective transistors for applying the pulses generated by said oscillator to said third and fourth windings alternately and means for turning one of said respective transistors on when said multivibrator is in its first state and for turning the other of said respective transistors on when said multivibrator is in its second state.

References Cited
UNITED STATES PATENTS

| | | | |
|---|---|---|---|
| 2,706,765 | 4/1955 | Lengvenis | 317—148 X |
| 3,098,919 | 7/1963 | Paulson | 219—20 |
| 3,225,268 | 12/1963 | Metzadour | 317—148.5 |
| 3,229,112 | 1/1966 | Hagland et al. | 317—148 X |
| 3,233,126 | 2/1966 | Evalds et al. | 307—88.5 |
| 3,349,223 | 10/1967 | Barter | 219—505 X |

ROBERT A. O'LEARY, *Primary Examiner.*

WILLIAM E. WAYNER, *Assistant Examiner.*

U.S. Cl. X.R.

219—501; 330—8; 307—314, 310, 247; 317—148